Patented Aug. 20, 1929.

1,725,649

UNITED STATES PATENT OFFICE.

GEORGE D. KNIGHT, OF REDWOOD CITY, CALIFORNIA, ASSIGNOR TO EMORY WINSHIP, OF MACON, GEORGIA.

INK COMPOSITION AND PROCESS OF MANUFACTURING THE SAME.

No Drawing. Application filed April 1, 1927. Serial No. 180,343.

The present invention relates to novel ink compositions and processes of manufacturing the same. More particularly the invention relates to the production of novel intaglio inks and ink bases.

Various inks for intaglio printing have been proposed, some of which are in common use. Inks of this type are ordinarily sold in paste form and are of such consistency that before use it is necessary to add a diluent thereto which is miscible with the ink composition and which volatilizes readily or is converted into a gaseous form at low temperatures, enhancing the drying properties of the ink. Because of the nature of such compositions, hydro-carbon solvents or thinners such as gasoline, benzene, naphtha and the like must be used. Because of the slow drying qualities of such inks it is necessary to apply relatively high heat to the freshly printed matter to cause rapid evaporation of the volatile constituents of the ink. The fumes emitted are toxic and nauseating in effect and constitute a nuisance in the vicinity of the press rooms unless elaborate and expensive measures are taken to dispose of them. The evolved gases and vapors are also highly flammable having a low flash point, with the result that the fire hazards and insurance rates are very high. A further disadvantage of such prior inks is that they are of such a nature as to necessitate the use of hydrocarbon solvents to effect a proper cleaning of the printing presses. Because of the prohibitive cost of non-flammable solvents, it is the practice to use the lower priced substances such as gasoline for cleaning purposes which add to the fire hazard, nuisance and injurious effects of these inks.

I have found it possible to provide improved intaglio inks containing large percentages of water, which when used as vehicles or carriers for inks, reduce the flammability and nauseating or toxic effects of the fumes emitted, and the fire hazard to a marked degree. At the same time the appearance, working and printing qualities of such inks are excellent in character. In this way I have been successful in producing high grade inks at low cost, which are non-injurious in character, liberate substantially no nauseating fumes when exposed to the atmosphere and are of low flammability.

Accordingly, an object of my invention is to provide inks which are relatively non-injurious and of low flammability which withstand the action of the elements to a degree suitable for use in high grade printing work, and dry with greater rapidity than inks heretofore proposed thereby permitting increased speed of operation of existing apparatus, as well as substantial reduction in labor and cost of operation in printing establishments.

Still further objects of the invention will appear from the more detailed description of the preferred embodiments hereinafter more fully set forth, and are such as may be attained by a utilization of various combinations, sub-combinations and principles hereinafter more fully set forth, and as defined by the terms of the appended claims.

As the first step in one method of producing my improved ink, a syrup is compounded from gilsonite or uintahite, dissolved in a hydrocarbon liquid. Petroleum distillates lighter than kerosene and preferably heavier than gasoline such for example as the petroleum distillate coming over between 310° to 412° F. known as "10-P thinner" or the petroleum distillate coming over between 251° F. to 392° F. known as "M & P thinner", marketed by the Standard Oil Company, or the coal tar distillates known as "solvent naphtha" coming over between 140° to 170° C. including xylols, xylenes and the like are my preferred solvents. These distillates are lighter than kerosene and heavier than gasoline as just stated, and when a hydrocarbon solvent lighter than kerosene and heavier than gasoline is hereinafter referred to, it should be understood that I am referring to said distillates. This syrup is hereinafter referred to as my "gilsonite syrup".

My gilsonite syrup contains approximately from 7 to 50 percent and preferably about 34 percent of gilsonite. This syrup may be prepared in the following proportions and manner: To approximately from 500 to 8,000 grams, preferably about 4,000 grams, of gilsonite is added about 8,000 cc. of the petroleum distillate known as "The M & P thinner" and the mixture is heated or otherwise treated to form a miscible suspension or a solution of the gilsonite in the distillate. Because of the volatile nature of the distillate, the mixture is preferably confined in an enclosed vessel to prevent loss of the constituents which vaporize during the heating and which when present in the completed inks volatilize at relatively low temperatures and aid the drying qualities of the inks. In practice especially satisfactory results are attained in forming my gilsonite syrup by enclosing the mixture of gilsonite and distillate in a receptacle and then heating the receptacle in a manner to cause a pressure of about 70 pounds per square inch to develop therein for a period of about one hour. In this way a satisfactory solution or suspension is obtained which may be filtered to separate impurities therefrom and the syrup is then ready for use. While in the preferred method of forming the gilsonite syrup, a pressure of 70 pounds per square inch is permitted to develop within the receptacle, it will be understood that by suitably heating the mixture and agitating the same at various pressures and for varying times in accordance with the results desired, satisfactory solutions may be obtained. For example, I have found that a good solution or suspension of gilsonite can also be obtained by heating the mixture of gilsonite and solvent to a temperature in excess of 100° C. preferably about 210° C. without the use of pressure.

Using the above syrup I may prepare my improved ink comprising a substantial percentage of water. Because of the inclusion of water I term my improved ink "semi-oil" ink. I have found that the water may be incorporated in the gilsonite syrup if a sticky or tacky solution is first prepared by forming a glue syrup or solution by adding about 1,000 to 6,000 grams, preferably about 4,000 grams, of glue to about 4,000 to 20,000 cc. preferably 14,500 cc. of water or the like, and cooking the mixture to form a solution. If solid glue is used the mixture should be cooked under a pressure of about 70 pounds per square inch for about two hours.

The glue solution or syrup may be filtered to separate the impurities therefrom. To about 500 to 2,500 cc. preferably about 1,500 cc. of the glue solution prepared in this manner is added about 2,000 cc. to 6,000 cc. preferably about 4,000 cc. of the gilsonite syrup prepared as above described. This mixture is then subjected to a cooking operation in a closed vessel under pressure, preferably under a pressure of about 60 pounds to the square inch for a period of about one-half hour to form the ink vehicle. The ink vehicle or carrier so formed may be filtered and the desired pigment or coloring matter added. The mixture is then passed through a mill to form a suitable suspension preferably colloidal in nature, of pigment, in the carrier, and the ink is then ready for use.

If desired, instead of forming my gilsonite syrup independently, the gilsonite and hydrocarbon liquid may be mixed with the glue solution above described and this mixture subjected to the cooking operation above set forth to form my improved vehicle. The glue apparently functions as a homogenizing agent or substance for the mixture of hydrocarbon liquid and water, in addition to serving to give highly desirable body qualities to the vehicle for intaglio printing purposes.

The vehicle of the semi-oil printing inks of my invention should contain approximately 7 to 25 percent by weight of water, approximately 2.5 to 7.5 percent of glue, approximately 38 to 65 percent of a hydrocarbon liquid, and approximately 10 to 30 percent of mineral hydrocarbon such as gilsonite. Preferably such a vehicle should comprise about 22 percent of water, about 5 percent of glue, about 51 percent of a hydrocarbon solvent, and about 22 percent of a mineral hydrocarbon such as gilsonite. Suitable pigments will be incorporated in the above vehicle. These inks are not miscible with water.

The following specific examples of intaglio semi-oil inks made in accordance with the above disclosure are given.

*Example #1.*

21 gal. "M & P thinner."
9 gal. water.
18 lbs. glue.
75 lbs. gilsonite.
6 lbs. carbon black.
29 lbs. #1000 R. brown pigment.
1 lb. red lake pigment.
1 lb. orange lake pigment.

*Example #2.*

21 gals. "M & P thinner."
9 gals. water.
18 lbs. glue.
75 lbs. gilsonite.
6 lbs. carbon black.
4 lbs. red lake pigment.
5 lbs. orange lake pigment.
4 lbs. #1000 R. brown pigment.

I have discovered that my improved ink base may also be compounded by adding the proper proportions of dry glue, dry gilsonite, water and solvent together in a kettle or receptacle, and cooking for about an hour and a half at 70 pounds pressure to form a homogeneous liquid base.

The inks may also be compounded by mixing the glue solution and gilsonite syrup with pigments in a mill, preferably of the ball type and milling the mixture to form a colloidal suspension of the pigment.

These specific examples are given to illustrate the scope of the invention, so far as the addition of proper pigments is concerned, and to furnish an example of an ink vehicle as above described. It should be understood, however, that the invention is not restricted to such examples but that the scope thereof is to be determined from the following claims.

Accordingly, what is desired to be secured by Letters Patent and is claimed as new is:

1. A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting entirely of a syrup of an asphaltic base and a hydrocarbon solvent, a syrup of a glue and water in the ratio of approximately three parts of said asphaltic syrup to one part of said second named syrup and pigment.

2. A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting entirely of gilsonite and a hydrocarbon distillate in the proportions by weight of approximately five to two, a solution of glue in water and a pigment united to form a homogeneous mixture.

3. A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting of water and gilsonite in approximately the same amounts by weight combined with a hydrocarbon distillate, a glue and pigment.

4. A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting entirely of water and gilsonite in approximately the same amount by weight combined with a hydrocarbon distillate of a relatively high degree of fluidity and moderate volatility and a glue in sufficient quantity to cause said water distillate and gilsonite to form a homogeneous mixture.

5. A quick drying ink for use in intaglio printing of relatively high fluidity and a degree of homogeneity sufficient to cause it to enter and be retained in the depressions of a hard metal intaglio printing form after wiping thereof and to be withdrawn from said depressions by paper without spreading on or excessive penetration in said paper, consisting of approximately 22% gilsonite, 51% of a hydrocarbon solvent of gilsonite, approximately 22% of water, and approximately 5% of glue united to constitute a homogeneous mixture.

In testimony whereof I affix my signature.

GEORGE D. KNIGHT.